United States Patent

Shimomura et al.

[11] Patent Number: 4,759,333
[45] Date of Patent: Jul. 26, 1988

[54] FUEL CONTROL APPARATUS

[75] Inventors: Setsuhiro Shimomura; Yasuo Tada, both of Himeji, Japan

[73] Assignee: Mitsubishi Denki Kabushiki Kaisha, Tokyo, Japan

[21] Appl. No.: 39,163

[22] Filed: Apr. 17, 1987

[30] Foreign Application Priority Data

Apr. 22, 1986 [JP] Japan ................................. 61-95132
Apr. 29, 1986 [JP] Japan ................................ 61-100053

[51] Int. Cl.⁴ ............................................. F02D 41/18
[52] U.S. Cl. ..................................... 123/494; 73/118.2
[58] Field of Search ................ 123/494; 73/118.2, 204

[56] References Cited

U.S. PATENT DOCUMENTS 4,462,251  7/1984  Sumal ................................. 73/118.2
4,505,248  3/1985  Yuzawa et al. ...................... 123/494
4,565,091  1/1986  Ito et al. ............................... 73/204

FOREIGN PATENT DOCUMENTS 0162293  11/1985  European Pat. Off. .
2927378   1/1981  Fed. Rep. of Germany .
3207394   9/1983  Fed. Rep. of Germany .
54-76182   6/1979  Japan .
60-53638   3/1985  Japan .................................. 123/494

OTHER PUBLICATIONS

Patent Abstracts of Japan, vol. 8, No. 121 (P-278) [1558], 7th June 1984, & JP-A-59-27 222 (Nissan Jidosha K.K.) 13-02-1984.

Primary Examiner—Andrew M. Dolinar
Attorney, Agent, or Firm—Oblon, Fisher, Spivak, McClelland & Maier

[57] ABSTRACT

In a fuel control apparatus having a hot-wire type intake air quantity sensor for burning-off a deposit on a hot wire, the hot wire is heated when the output of the sensor indicates that suction of air in an intake air passage for an engine is stopped or when a certain time goes on after the generation of the output, or when the output of the sensor is lower than a predetermined value under the condition that a fuel control valve is deenergized and an engine stop flag is reset after a power source switch has been turned off.

5 Claims, 4 Drawing Sheets

FUEL CONTROL APPARATUS

The present invention relates to a fuel control apparatus for an internal combustion engine. More particularly, it relates to a fuel control apparatus for burning at a high temperature a deposit on the surface of a hot-wire type intake air quantity sensor used for controlling a fuel-supply to an internal combustion engine without firing of a gasoline-air mixture.

The characteristics of hot-wire type intake air quantity sensors change depending on substances deposited on the surface of the sensors. Deposition of the substances causes an error in the quantity of fuel to be supplied to an engine, whereby there arise problems of deterioration of the exhaust gas and reduction in operational performance. To cope with the problems, the hot wire has been heretofore heated at a temperature higher than a temperature in the normal operation of the engine after the engine has been stopped to thereby burn off the deposit. A method of burning-off of the deposit is disclosed, for instance, in Japanese Unexamined Patent Publication No. 76182/1979.

It is revealed from experiments that temperature for heating the hot wires should be about 1000° C. in order to obtain an effective burning-off operation. However, when the hot wire is heated at 1000° C., a gasoline-air mixture is possibly fired. The firing of the mixture is inconvenient for the operation of the intake air quantity sensor disposed in an air-intake passage for a gasoline engine.

Heretofore, in order to avoid the firing of the gasoline-air mixture, the burning-off operations have been carried out only when the temperature of the engine and the revolution of the engine satisfy predetermined conditions during its operation, and the mixture excessively supplied to the air-intake passage during warming-up operations for the engine is sufficiently scavenged.

However, various experiments revealed that the burning-off under the above-mentioned conditions have not provided a sufficient result because the firing of the fuel-air mixture has been sometimes caused.

A large amount of gasoline sometimes stays around a fuel control valve due to the blowing-back of the intake air when the engine is operated in the fully opened condition even though the warming-up of the engine has finished. In this case, there causes rapid reverse flowing of the gasoline-air mixture around the intake air quantity sensor when the engine is stopped. If the burning-off is conducted under such condition, the firing of the gasoline is resulted.

Further, a large amount of the gasoline may be supplied into the intake air passage due to troubles in the fuel control valve or another parts even though the above-mentioned conditions, i.e. the temperature and the revolution of the engine has been satisfied. In this event, the engine may stop owing to excessively high air-fuel ratio, the phenomenon being called engine stop. The burning-off carried out under this condition may cause the firing of the gasoline.

It is an object of the present invention to provide a fuel control apparatus eliminating possibility of the undesired firing of a gasoline-air mixture.

Therefore, the present invention to provide a fuel control apparatus which comprises a fuel supplying means for supplying fuel to an internal combustion engine depending on the operation of a fuel control valve, a hot-wire type intake air quantity sensor disposed in an air-intake passage for the internal combustion engine to detect the quantity of air passing therethrough, means for heating a hot wire at a temperture higher than a temperature in the normal operation so as to burn off a deposit on the hot wire by detecting the output of the sensor indicating that suction of air to the engine is stopped, after the engine has been stopped.

Further, the present invention is to provide a fuel control apparatus for calculating the quantity of fuel required for operating an internal combustion engine based on an output of a hot-wire type intake air quantity sensor disposed in an air-intake passage for the internal combustion engine and supplying the optimum amount of the fuel to the engine by controlling a fuel control valve in accordance with the calculated value, characterized in that the fuel control apparatus comprises a burn-off control means for heating the hot wire at a temperature higher than a temperature in the normal operation so as to burn off a deposit on the hot wire only when the output of the intake air quantity sensor is lower than a predetermined value under the condition that the fuel control valve is deenergized and an engine stop flag is in a reset condition after a power switch has been turned off.

Preferred embodiment of the fuel control apparatus of the present invention will be described with reference to drawings.

Figure 1:
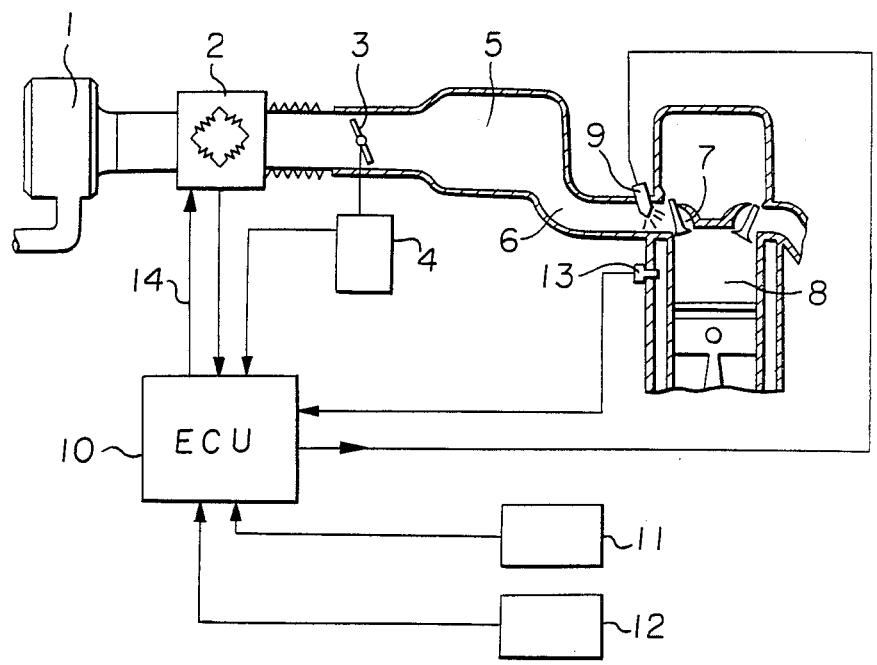
FIG. 1 is a diagram showing an embodiment of the fuel control apparatus according to the present invention.

FIG. 1 is a diagram showing the construction of a typical fuel injection controlling apparatus using a hot-wire type intake air quantity sensor 2 (hereinbelow, referred to as an AFS) for detecting the quantity of air sucked into an internal combustion engine. In FIG. 1, a reference numeral 1 designates an air cleaner; a numeral 3 designates a throttle valve for controlling the quantity of air sucked into the engine and a numeral 4 designates a throttle sensor being operable in association with the throttle valve 3 and generating a voltage signal depending on the movement of the throttle valve 3. The voltage signal of the throttle sensor 4 is applied to an electronic control unit (hereinbelow, referred to as an ECU). A surge tank 5 is communicated with an intake manifold 6 which is, in turn, connected to a cylinder 8. An inlet valve 7 driven by a cam (not shown) is provided in the cylinder 8.

A fuel control valve 9 (hereinbelow, referred to as an injector) is provided for each of the cylinders 8. In FIG. 1, only one cylinder 8 is shown for simplification of the drawings although a plurality of the cylinders are in fact provided in the engine.

The ECU 10 controls an amount of the fuel injected from the injector 9 at a predetermined air-fuel ratio with respect to the quantity of air sucked to each of the cylinders 8. The ECU 10 determines the fuel quantity to be injected on the basis of each signal from the AFS 2, a crank angle sensor 11, a starting switch 12, a temperature sensor 13 for detecting the temperature of cooling water for the engine and a throttle sensor 4, and controls a pulse width for feeding the fuel so that the fuel is intermittently injected from the injector 9 in synchronism with the signal of the crank angle sensor 11 at a constant interval. The ECU 10 generates a burning-off control signal 14 when conditions for the burning-off are all satisfied. The construction and function related to control of the burning-off of the AFS are well known, therefore description is omitted.

Figure 2:
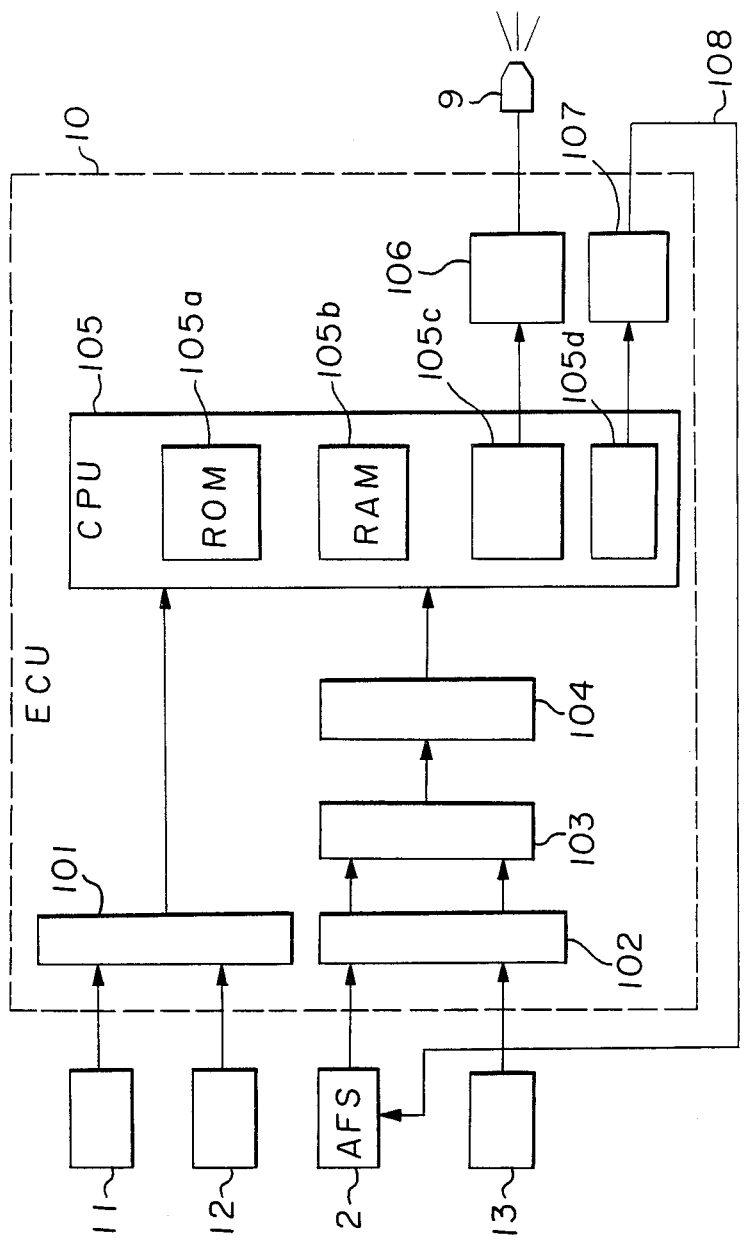
FIG. 2 is a block diagram showing an embodiment of the electronic control unit used for the fuel control apparatus shown in a FIG. 1.

FIG. 2 is a block diagram showing an internal structure of the ECU 10. In FIG. 2, a reference numeral 101 designates an interface circuit for inputting. digital values from the crank angle sensor 11 and the starting switch 12.

An analogue interface circuit 102 receives each signal from the AFS 2 and the water temperature sensor 13 and outputs an output signal to a multiplexer 103. An analogue signal from the multiplexer 103 is fed to an analogue-digital (A/d) transducer 104 in which the analogue signal is converted into a digital signal.

A central processing unit 105 (hereinbelow, referred to as a CPU) includes an ROM 105a, an RAM 105b and timers 105c and 105d. The CPU calculates the pulse width for actuating the injector according to a program stored in the ROM 105a on the basis of the signals from the interface circuit 101 and the A/D transducer 104, and outputs a pulse having a predetermined time width through the timer 105c. A driving circuit 106 amplifys the pulse signal from the timer 105c to drive the injector 9. A system for controlling the quantity of the fuel is known, and therefor description is omitted.

Figure 3:
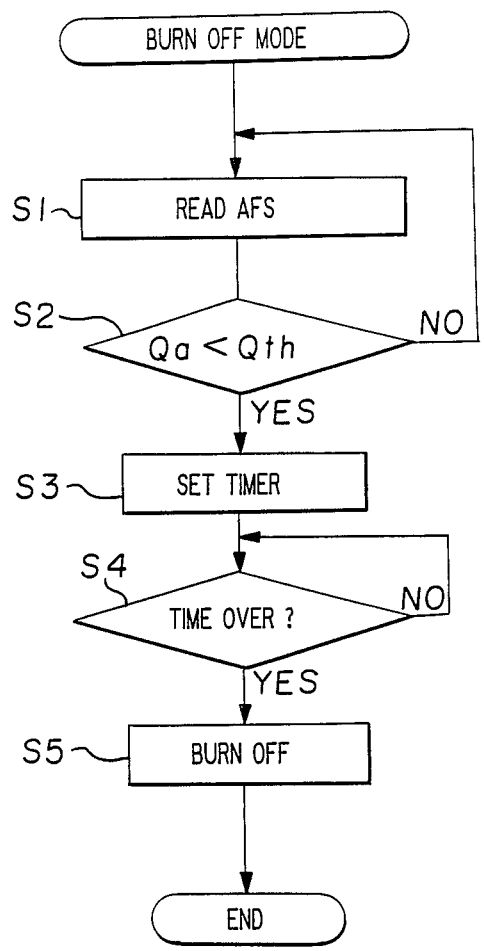
FIG. 3 is a flow chart showing an example of a program for the fuel control apparatus of the first embodiment.

The timer 105d is adapted to produce a burning-off pulse signal according to a programmed operation as shown in FIG. 3. The pulse signal is amplified in the driving circuit 107 to be supplied as a burning-off signal 18 to the AFS 2. A program concerning the burning-off of the hot wire of the intake air quantity sensor used for fuel control apparatus shown in FIGS. 1 and 2 will be described with reference to a flow chart in FIG. 3.

The flow chart shows only the sequential operations from the stop of the engine to the burning-off operation, and the sequential operations for controlling the fuel during the operation of the engine is omitted.

Figure 4:
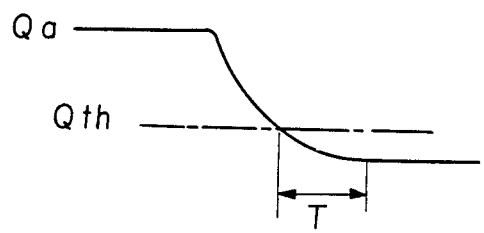
FIG. 4 is characteristic diagram showing the waveform of an output from an intake air quantity sensor when an engine is stopped.

First of all, the output Qa of the AFS 2 is read at Step S1. The ouput value Qa is compared with a value Qth corresponding to the quantity of the intake air at Step S2. The quantity of the intake air Qth is determined to be a value which is so considered that suction of the air is substantially stopped as shown in FIG. 4.

When a relation of Qa<Qth is established, then, Step S3 is taken, where a timer is set. A time period set by the timer is so determined that it is longer than a time period T in which the output Qa becomes lower than the intake air quantity Qth and reaches nearly zero, but it is shorter than a time period in which the gasoline remaining in the fuel supplying portion evaporates and reversely flows around the sensor after suction of the intake air has been stopped.

At Step S4, determination is made as to whether or not the time period set by the timer is over. If yes, the burning-off operation is carried out by Step S5.

In case the quantity of the intake air rapidly decreases after the engine has been stopped, the burning-off operation may be carried out immediately after the establishment of the relation of Qa<Qth. In such case, Step S4 may be omitted.

In the above-mentioned embodiment, since the burning-off operation is carried out before the gasoline remaining at the fuel supplying portion evaporates and reversely flows around the intake air quantity sensor after the engine has been stopped and suction of the intake air has been substantailly stopped, there is no possibility of the firing of the gasoline. Further, the above-mentioned effect can be attained by a slight modification of a conventional program for operating fuel control apparatus.

Figure 5:
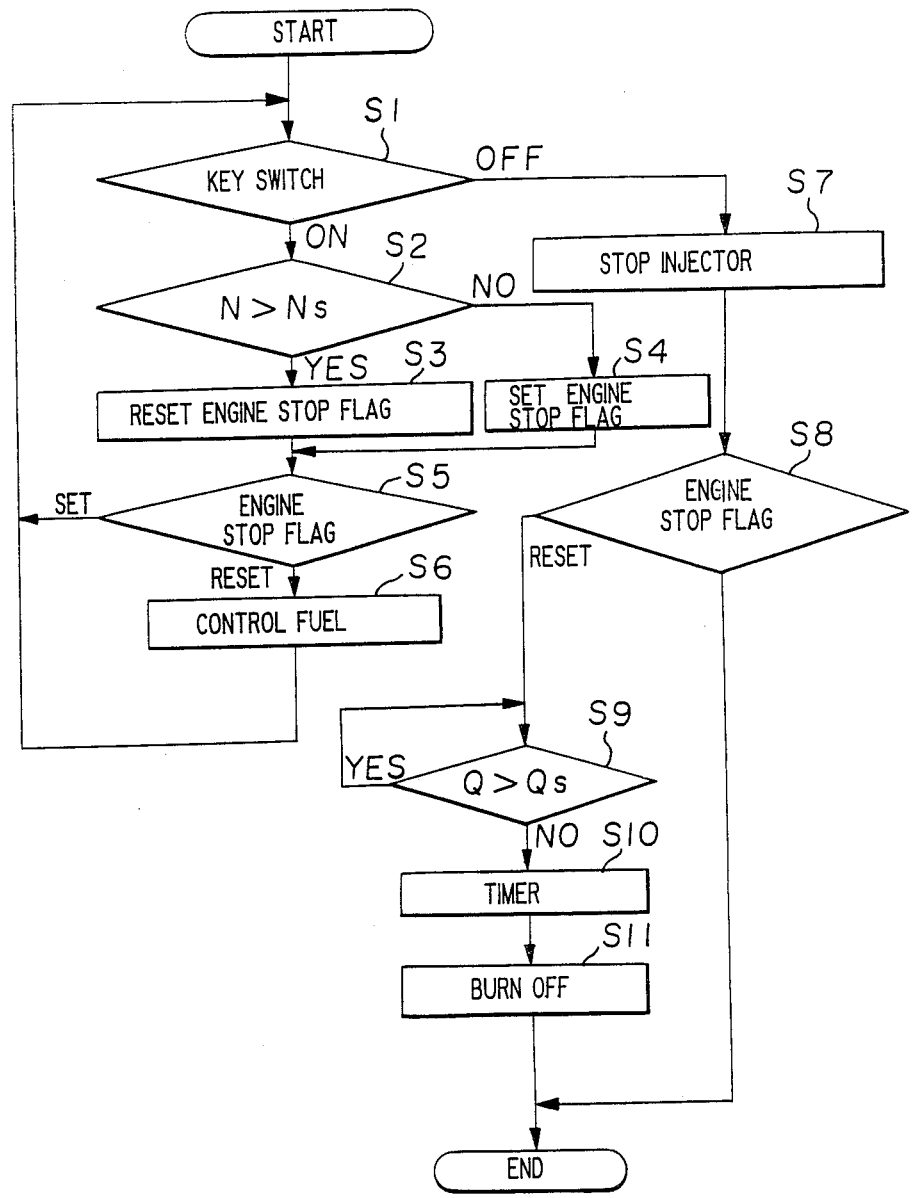
FIG. 5 shows a flow chart showing an example of the execution of a program for the fuel control apparatus according to the second embodiment of the present invention.

A second embodiment of the fuel control apparatus according to the present invention will be described. The contruction of the apparatus according to the second embodiment is the same as that of the first embodiment shown in FIGS. 1 and 2 provided that a program for operating the burning-off operation is different. The program will be described with reference to FIG. 5.

The situation of a key switch (a power source switch) is judged at Step S1. When the key switch is in an ON state, then determination is made as to whether the revolution of the engine is higher or lower than a predetermined value NS. The predetermined value NS corresponds to the revolution which is regarded as the engine being substantially stopped. If N>NS, i.e. the engine is normally operated, an engine stop flag is reset at Step S3. If N≦NS, the engine stop is set at Step S4.

At Step S5, the situation of the engine stop flag is judged. When the engine stop flag is reset, control of the fuel is carried out at Step S6, after which the sequential operations is returned to Step S1. When the engine stop flag is in a set condition, the sequential operations go back to Step S1 without taking Step S6. In this case, the fuel is not needlessly supplied.

When the key switch is in an OFF state at Step S1, actuation of the injector 9 is stopped at Step S7 because it is unnecessary to feed the fuel. In case that a power source for the injector 9 is turned off in association with the operation of the key switch Step S7 may be omitted.

The situation of the engine stop flag is judged at Step S8. When the engine stop flag is in a reset condition, namely, there is no engine stop before the turning-off of the key switch, Step S9 is taken, where the output Q of the AFS 2 is compared with the predetermined value Qs. The predetermined value Qs corresponds to a value indicating that suction of the intake air is substantially stopped. If the quantity of the intake air is reduced to satisfy a relation Q≧QS, a timer is actuated at Step S10. A time period set by the timer is determined in such a manner that the quantity of the intake air becomes nearly zero. When the time period set by the timer is over, the burning-off operation is carried out by Step S11. Step S10 may be eliminated if the burning-off operation may be conducted under the condition of Q=Qs.

When the engine stop flag is in a set state at Step S8, the program is ended without taking Steps S9–S11. Namely, the burning-off operation is not carried out when the engine stop takes place before the turning-off of the key switch.

The burning-off operation is the same as that described with reference to FIG. 2.

In the second embodiment, gasoline is not needlessly supplied when the engine stop takes place or the key switch is turned on. The burning-off operation is carried out only when the engine stop flag is in a reset state after the key switch has been turned off (namely, when there is no engine stop during the operation of the engine). When the engine stop takes place during the operation, the engine stop flag is set. Accordingly, there is no possibility of the burning-off operation when the engine is stopped due to failure of the injector and other parts in the fuel supplying system and a large amount of gasoline remains in the intake air passage. Therefore there is no risk of the firing.

In the second embodiment of the present invention, since the burning-off is carried out immediately after the suction of the intake air is stopped, the burning-off is done before the fuel-air mixture reaches around the AFS even if the fuel remains in the intake air passage. Therefore, there is provided double safeness. Further, the above-mentioned effect can be obtained by a slight modification of a conventional program.

We claim:

1. A fuel control apparatus which comprises a fuel supplying means for supplying fuel to an internal combustion engine depending on the operation of a fuel control valve, a hot-wire type intake air quantity sensor disposed in an air-intake passage for said internal combustion engine to detect the quantity of air passing therethrough, means for heating a hot wire at a temperature higher than a temperature in the normal operation so as to burn off a deposit on said hot wire by detecting the output of said sensor indicating that suction of air to said engine is stopped, after said engine has been stopped.

2. The fuel control apparatus according to claim 1, wherein said hot wire is heated a predetermined time after the detection of the output of said sensor indicating that suction of air has been stopped.

3. A fuel control apparatus for calculating the quantity of fuel required for operating an internal combustion engine based on an output of a hot-wire type intake air quantity sensor disposed in an air intake passage for the internal combustion engine and supplying the optimum amount of the fuel to the engine by controlling a fuel control valve in accordance with the calculated value, characterized in that the fuel control apparatus comprises a burn-off control means for heating the hot wire at a temperature higher than a temperature in the normal operation so as to burn off a deposit on said hot wire only when the output of said intake air quantity sensor is lower than a predetermined value under the condition that said fuel control value is deenergized, an engine stop flag is in a reset condition after a power source switch has been turned off and responsive to an indication from said sensor that the suction of air has been stopped.

4. The fuel control apparatus according to claim 3, wherein said burn-off control means is so adapted that an engine stop flag is set and control of said fuel control valve is stopped when the revolution of said engine is lower than a predetermined value under the condition that a power source switch has been turned on.

5. The fuel control apparatus according to claim 3, wherein said burn-off control means is so adapted than an engine stop flag is set and control of said fuel control valve is stopped when the revolution of said engine is lower than a predetermined value under the condition that a power source switch has been turned on.

* * * * *